United States Patent
Kegel et al.

(10) Patent No.: US 12,221,090 B2
(45) Date of Patent: Feb. 11, 2025

(54) METHOD AND DEVICE FOR DETERMINING A TORQUE, AND AGRICULTURAL TOWING VEHICLE

(71) Applicant: DEERE & COMPANY, Moline, IL (US)

(72) Inventors: Volker Kegel, Mannheim (DE); David Mueller, Dettenheim (DE); Norbert Fritz, Ilvesheim (DE); Rainer Gugel, Plankstadt (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/666,122

(22) Filed: May 16, 2024

(65) Prior Publication Data

US 2024/0391448 A1   Nov. 28, 2024

(30) Foreign Application Priority Data

May 24, 2023   (DE) .......................... 10202311359.8

(51) Int. Cl.
*B60W 10/02* (2006.01)
*B60W 20/40* (2016.01)

(52) U.S. Cl.
CPC ............ *B60W 10/02* (2013.01); *B60W 20/40* (2013.01); *B60W 2710/027* (2013.01)

(58) Field of Classification Search
CPC ................ B60W 10/02; B60W 20/40; B60W 2710/027; F16D 48/06
See application file for complete search history.

(56) References Cited

U.S. PATENT DOCUMENTS

| | | | |
|---|---|---|---|
| 9,618,064 B2 | 4/2017 | Kuros et al. | |
| 11,378,024 B2* | 7/2022 | Kinjo | ...................... F02D 29/02 |
| 2002/0052265 A1* | 5/2002 | Segawa | .................. F16H 61/143 |
| | | | 477/65 |
| 2009/0312895 A1* | 12/2009 | Kim | ......................... B60K 6/48 |
| | | | 903/902 |
| 2018/0009433 A1* | 1/2018 | Johri | ..................... F02D 41/065 |

(Continued)

FOREIGN PATENT DOCUMENTS

| | | |
|---|---|---|
| DE | 102019209401 A1 | 12/2020 |
| EP | 1293697 A2 | 3/2003 |

OTHER PUBLICATIONS

Extended European Search Report and Written Opinion issued in European Patent Application No. 24173733.7 dated Oct. 29, 2024, in 14 pages.

*Primary Examiner* — Edwin A Young

(57) ABSTRACT

A method for determining a torque acting at a position of a drive train of an agricultural towing vehicle, includes controlling a clutch of the drive train between a closed state and an open state, capturing a drive-side rotational speed at the clutch via a first rotational speed sensor, capturing an output-side rotational speed at the clutch via a second rotational speed sensor, controlling the clutch in the direction of the open state, determining, during controlling the clutch, a difference between the rotational speeds on the drive and output sides, comparing the difference with a predetermined difference limit value, capturing the value of a physical variable that causes the clutch control on the basis of the comparison result, and determining the torque on the basis of the captured value of the physical variable.

20 Claims, 2 Drawing Sheets

(56) References Cited

U.S. PATENT DOCUMENTS

2018/0172089 A1  6/2018  Bulgrien
2018/0187728 A1  7/2018  Vora et al.
2022/0235533 A1  7/2022  Ikeda et al.

* cited by examiner

METHOD AND DEVICE FOR DETERMINING A TORQUE, AND AGRICULTURAL TOWING VEHICLE

CROSS-REFERENCE TO RELATED APPLICATIONS

This application claims priority to German Patent Application No. 102023113598.8, filed May 24, 2023, which is hereby incorporated by reference.

FIELD OF THE DISCLOSURE

The disclosure relates to a method and device for determining a torque acting at a position of a drive train of an agricultural towing vehicle.

BACKGROUND

EP 1 293 697 A2 discloses a method and a device for controlling a hydraulically operated clutch, in particular a PTO clutch. Sensors are used to determine a rotational speed upstream and downstream of the clutch, with a clutch slip being determined therefrom. A value corresponding to the clutch pressure is continuously determined. By means of a controlled time change of the value corresponding to the clutch pressure, the clutch slip is continuously adjusted and maintained at a constant value. The torque transmitted by the clutch is permanently determined from the constant slip value and a value corresponding to the clutch pressure.

SUMMARY

Starting from reference point, it is the object of the present disclosure to propose a method, a device, and an agricultural towing vehicle, which determine a torque acting at a position of a drive train of the towing vehicle in a technically simpler manner.

This object is achieved by a method, device, and an agricultural towing vehicle having the features of any independent claim. The dependent claims can relate to more advantageous embodiments of the disclosure.

The disclosure proposes a method for determining a torque acting at a position of a drive train of an agricultural towing vehicle, for example a tractor. The drive train comprises at least one clutch which can be controlled between a closed state and an open state. A drive-side rotational speed on the clutch is captured by means of a first rotational speed sensor, whereas an output-side rotational speed at the clutch is captured by means of a second rotational speed sensor. The first rotational speed sensor is in particular a first, drive-side rotational speed sensor. The second rotational speed sensor is in particular a second, output-side rotational speed sensor.

While carrying out the method, the clutch is controlled in the direction of the open state. A difference, in particular a rotational speed difference, is determined between the rotational speeds captured at the clutch on the drive and output sides. This difference is compared with a predetermined difference limit value. The value of a physical variable that causes the clutch control (e.g. a hydraulic pressure or an electrical control current of a valve, in particular an electromechanical actuator and/or a hydraulic valve) is captured on the basis of the comparison result. The torque sought at a position of the drive train is in turn determined on the basis of this captured value.

The method according to the disclosure makes use of the consideration that, starting from a closed clutch, the time or state of a starting clutch slip reflects, for example, the torque currently transmitted by this clutch and, consequently, the physical relationships of the clutch when slip begins can be used to determine the torque. With this consideration, the clutch is controlled from a closed state in the direction of the open state. The rotational speeds captured on the drive and output sides of the clutch are processed to form a difference, in particular a rotational speed difference. The predetermined difference limit value is used to define precise technical conditions at the clutch which should correspond to the "starting clutch slip" state. During clutch control, the value of the above-mentioned difference can be determined continuously and this value can also be continuously compared with the predetermined difference limit value, with the result that a comparison result, in particular a calculated comparison result, is available. By means of the comparison result, it is technically easy to decide which state the clutch has. In particular, it can be decided whether it has reached the "starting clutch slip" state.

The value of the above-mentioned physical variable that causes the clutch control can be captured either continuously or at least for the time of a certain comparison result. These values can be easily accessed from a technical point of view (e.g. via a control unit or a communication bus of the towing vehicle). The sought torque or its value can in turn be determined easily from a technical point of view (e.g. via provided characteristic data such as formulas or characteristic curves) on the basis of the captured value of this physical variable.

Thus, the torque acting at a position of the drive train can be determined solely with a few, in particular two, rotational speed sensors and little technical effort. The method steps needed to determine the torque keep the physical complexity of the method low and thus promote a precise determination of the torque at a low cost. In particular, relatively expensive torque sensors can be dispensed with.

As already mentioned, an existing difference is determined from the rotational speeds captured at the clutch on the drive and output sides. This difference can be formed directly as a rotational speed difference. Alternatively, a different physical variable derived from the rotational speed can be used to form a difference. For example, a difference can be determined from speeds, in particular rotational or angular speeds, which are captured on the drive and output sides of the clutch.

In one embodiment of the disclosure, the value of the physical variable that causes the clutch control is captured at least when the rotational speed difference reaches or exceeds the difference limit value. This means that the data needed to determine the torque can be provided with little technical effort.

In one embodiment, the clutch is controlled by an electromechanical actuator and/or a hydraulic valve and corresponding hydraulic fluid (e.g. oil). The hydraulic valve may be designed in particular as a proportional valve. This proven clutch control technology supports precise performance of the method. The electromechanical actuator can advantageously leads to a reduced energy consumption, since no hydraulic circuit has to be provided.

Furthermore, the valve used to control the clutch offers technically simple possible ways of capturing a suitable physical variable that causes the clutch control and its values. A hydraulic output pressure of the valve or an electrical control current controlling the valve is particularly appropriate for this purpose. The values of these physical variables are available for the performance of the method without any additional technical effort, since they are captured, processed, and transmitted anyway for other technical purposes in the towing vehicle, e.g. in a control unit or a communication bus (e.g. Isobus, CAN bus) of the vehicle.

In embodiment of the method, the torque is determined on the basis of provided characteristic data which represent a relationship between the physical variable that causes the clutch control and the torque. The characteristic data provided support a technically simple determination of the torque. For example, with a known value of the above-mentioned control current or hydraulic output pressure, the value of the torque can be determined mathematically simply on the basis of the characteristic data. In particular, the value of the torque is determined by equating this torque with a torque capacity of the clutch, this torque capacity M_kap being dependent on the physical variable that causes the clutch control. In particular, the torque capacity is directly dependent on the hydraulic output pressure or indirectly dependent on the control current (via the known relationship between the control current and the hydraulic output pressure).

The characteristic data are for example generated by a previous calibration of the clutch. The characteristic data can be provided, for example, as tabular value pairs, as a characteristic curve or as (a) formula(s). In particular, the torque sought can be equated with a torque capacity M_kap of the clutch when clutch slip begins or when the difference present due to the rotational speeds captured on the drive and output sides reaches or exceeds the predetermined difference limit value. In the case of an electromechanically and/or hydraulically controlled clutch, the following applies in this case to the torque capacity M_kap: M_kap=Dp(p_hy)−Df+Dv Apart from the variable value of the captured hydraulic output pressure p_hy of the valve controlling the clutch, the component Dp is known, e.g. by a one-off measurement at the clutch. In addition, the component Dp contains the geometry of the clutch and, if necessary, a coefficient of friction of the clutch plates.

The component Df is a known constant value and depends on physical spring sizes of the clutch, e.g. a force of the return spring(s) used, spring constant, prestress, spring stiffness, number of springs.

The component Dv takes into account the geometry of the clutch and the density of the hydraulic fluid used (e.g. oil). In addition, the component Dv depends on a rotational speed of that clutch side in the region of which the hydraulic fluid moves. For example, this rotational speed is =0 if the clutch is designed as a brake function and the aforementioned clutch side is then immovably connected to a transmission housing.

In a further embodiment of the disclosure, a torque is respectively determined with a plurality of clutches according to the method, wherein these torques are mathematically averaged (e.g. arithmetic mean value, mean deviation, standard deviation) in order to determine the torque acting at a position of the drive train on the basis thereof. The use of a plurality of clutches can improve the statistical accuracy of the torque to be determined. For example, a very short time interval between the control of the individual clutches is maintained in this case in order to ensure the same conditions as far as possible on the drive train and thereby avoid any major discrepancies of the respective torques at the individual clutches.

An embodiment of the method provides that, if the torque is repeatedly determined over time, a different clutch within the drive train is controlled for the purpose of determining the torque. In particular, all possible clutches are used in a specific order for the purpose of determining the torque. The additional thermal energy produced during clutch control for determining the torque is distributed evenly over all usable clutches by the alternating use of a different clutch, with the result that excessive stress on a single clutch within the drive train is avoided.

Further for example, a clutch for determining the torque is selected on the basis of a thermal capacity and/or on the basis of a current torque of a drive motor of the towing vehicle. For example, a clutch with a high torque capacity is selected in the case of a high drive motor torque, while a clutch with a low torque capacity is selected in the case of a low drive motor torque.

All clutch functions or clutches in the drive train can be selected for carrying out the method, e.g. clutches for transmission stages, clutch units for reversing the direction of travel, MFWD, etc.

In a further embodiment, an all-wheel clutch for activating and deactivating a front-axle drive of an agricultural towing vehicle is controlled as that clutch with which a torque is determined according to the method. The all-wheel clutch can have a drive connection to a front-axle transmission output of the vehicle transmission and is sometimes also referred to as an MFWD (Mechanical Front Wheel Drive) clutch. The all-wheel clutch can transmit a torque to a front-axle drive if required, with the result that the permanent rear-axle drive of the towing vehicle is supplemented by a front-axle drive in order to achieve an all-wheel drive. A total torque and a front axle torque can be determined using the method at a clutch of the vehicle transmission and at the all-wheel clutch. A rear axle torque can be determined by subtracting both values and the determined values of the front axle and rear axle torques can be compared with one another and evaluated. This supports a technically simple and precise assessment of whether or not the front-axle drive is required as a traction aid.

In an embodiment of the disclosure, the determined torque or torques is/are used to determine a traction coefficient of an agricultural towing vehicle with little technical effort. For example, torque values determined can be used to determine the drive and/or tractive forces of the vehicle wheels. A traction coefficient can then be precisely determined by taking into account other known physical variables on the towing vehicle (e.g. axle loads or contact forces).

The disclosure further relates to a device for determining a torque acting at a position of a drive train of an agricultural towing vehicle. The device comprises a control unit for carrying out the method as claimed in any one of the method claims. In particular, the control unit determines the torque acting at a position of the drive train. The control unit can control a clutch of the drive train between a closed state and an open state. In other words, the control unit can control the clutch of the drive train in such a way that the clutch can be set and/or adjusted, in particular can be moved, to a closed state and an open state. Likewise, the clutch may also be set and/or adjusted, in particular may be moved, to a state between the closed state and the open state. Different states of the clutch are achieved in particular by the fact that the control unit changes or varies the value of a physical variable that causes the clutch control. During such control, in particular during control in the direction of the open state of the clutch, the control unit can process the drive-side and output-side rotational speeds of the controlled clutch or physical variables derived from these rotational speeds and can form a difference from the drive-side and output-side values. The difference is compared in the control unit with a predetermined difference limit value which represents a "starting clutch slip" state. A specific comparison result corresponds to a specific value of the physical variable that causes the clutch control. This value is captured in the control unit and is used to derive the torque sought (e.g. via known characteristic data).

The control unit may be in the form of an electronic module, an embedded system, a computing unit, a computer, or a module for the open-loop and/or closed-loop control of individual components of the device. The control unit may comprise a processor, a memory and/or all of the software, hardware, algorithms, connections, and in particular also sensors, that are required for the open-loop and/or closed-loop control of the device or components thereof. Individual or all of the method steps of the disclosed method may be configured as a program or algorithm that can be executed on and/or by the control unit. The control unit may comprise any apparatus that can analyze data from various sensors, compare data, and make the decisions necessary to control, in open-loop and/or closed-loop fashion, and/or perform, the operation of the device and the required tasks for the open-loop control of the operation of the device.

The control unit may be connected to the device, in particular to the component parts (e.g. sensors, electromechanical actuators and/or hydraulic valves) of the device, for example signal-connected and/or connected in a signal-transmitting and/or data-conducting manner. The control unit can be used for the open-loop and/or closed-loop control and/or activation of the interconnected component parts. A connection in signal-connected fashion and/or signal-transmitting fashion and/or data-conducting fashion should be understood here as meaning that signals are exchanged between the connected component parts. The connection can be implemented so as to be wired, i.e. in particular with cables, and/or wireless, i.e. by radio, for example using Bluetooth. The communication bus can be, for example, Isobus, CAN bus or the like. The control unit may be assigned to the device for carrying out the method and/or to the agricultural towing vehicle, in particular may be arranged on the vehicle. The control unit may also be configured in two parts, for example as part of the agricultural towing vehicle and as part of the device. The control unit may be connected directly to the input and output unit which is arranged in a cab of the towing vehicle and by means of which data entered by an operator can be transmitted to the control unit or received from the control unit and output. It is however also conceivable for the control unit to be connected indirectly to the input and output unit by a superordinate control unit.

In an embodiment of the disclosure, the device comprises an electromechanical actuator and/or a hydraulic valve for controlling a selected clutch of the drive train. The control unit can be used to actuate and/or adjust the electromechanical actuator and/or the hydraulic valve such that the clutch can be controlled between a closed state and an open state. In other words, the electromechanical actuator and/or the hydraulic valve can be controlled with the control unit in such a way that the clutch can be set and/or adjusted, in particular can be moved, to the closed state and the open state. Likewise, the clutch may also be set and/or adjusted, in particular may be moved, to a state between the closed state and the open state. In particular, the control unit defines and/or processes the values of an electrical control current for the electromechanical actuator and/or the hydraulic valve. The control unit can also process the values of an output pressure of this electromechanical actuator and/or hydraulic valve (e.g. by means of a pressure sensor).

In a further embodiment, the device comprises a first rotational speed sensor for capturing a drive-side rotational speed at the clutch and a second rotational speed sensor for capturing an output-side rotational speed at the clutch. In particular, the first rotational speed sensor for capturing the drive-side rotational speed is also arranged on the drive side of the clutch. Further, in particular, the second rotational speed sensor for capturing the output-side rotational speed is also arranged on the output side of the clutch.

The disclosure further relates to an agricultural towing vehicle, for example a tractor, having a device as claimed in any of the apparatus claims. The device integrated in the towing vehicle makes it possible to determine a torque acting at a specific position of the drive train. This is done with little technical effort by virtue of a control unit of the device controlling a selected clutch of the drive train and evaluating the control variable (e.g. an electrical control current) as well as rotational speeds captured the clutch or values derived from it. With torques which can be determined in such a manner, the device can support technically simple and cost-effective drive management (e.g. traction aid) for the towing vehicle.

The above and other features will become apparent from the following detailed description and accompanying drawings.

BRIEF DESCRIPTION OF THE DRAWINGS

The disclosure and further advantages and advantageous developments and refinements of the disclosure, both in terms of the hardware and of the method, will be explained in more detail below by means of exemplary embodiments and with reference to the drawings. Component parts of equivalent or comparable function are identified by the same reference signs. In the drawings.

DETAILED DESCRIPTION

The embodiments or implementations disclosed in the above drawings and the following detailed description are not intended to be exhaustive or to limit the present disclosure to these embodiments or implementations.

Figure 1:
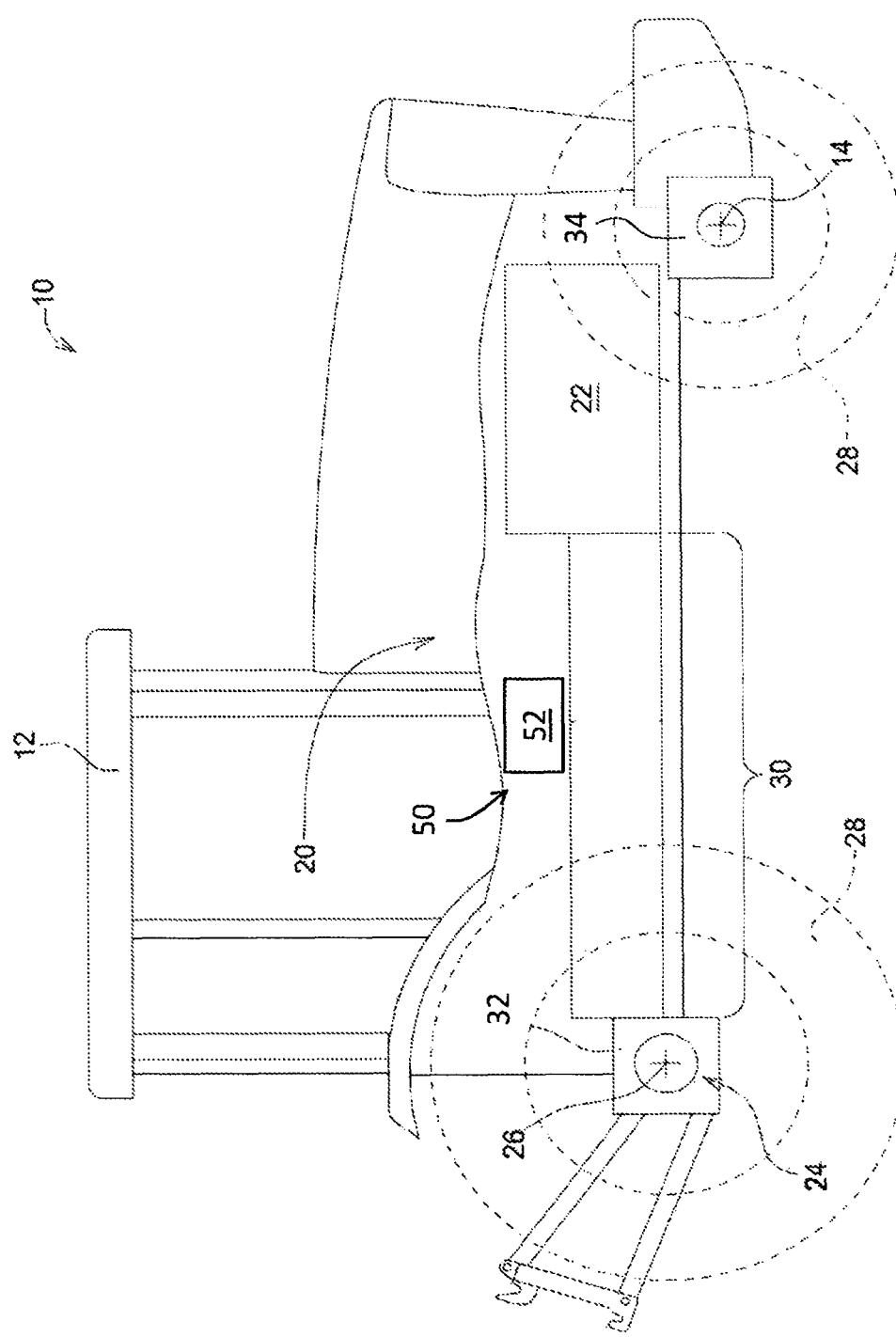
FIG. 1 shows a schematic illustration of an agricultural towing vehicle according to the disclosure.

FIG. 1 shows a schematic illustration of an agricultural towing vehicle 10 according to the disclosure, in particular in the form of a tractor, with a drive train 20 in one possible refinement. The basic structure of an agricultural towing vehicle 10 is assumed to be known to a person skilled in the art. The towing vehicle 10 also comprises a cab 12, a front vehicle axle 14, and a rear vehicle axle 26. The front vehicle axle 14 and the rear vehicle axle 26 are part of the drivetrain 20, with it being possible for the rear vehicle axle 26 generally to be permanently driven and the front vehicle axle 14 generally to be activated on demand.

The drive train 20 also comprises a drive motor 22, which may be in the form of an internal combustion engine, and a transmission structure, which may be composed of various individual transmission components. Starting from the drive motor 22, the transmission structure may have a transmission arrangement 30, a travel drive 24, a rear axle drive 32 and a front axle drive 34 in the power and torque flow. With the transmission arrangement 30, driving power of the drive motor 22, can be transmitted, in particular with different transmission stages, to the rear vehicle axle 26 and, if necessary, additionally to the front vehicle axle 14. The rear vehicle axle 26, which converts rotation of the front and/or the rear vehicle axle (via ground engagement means connected thereto) into propulsion of the tractor 10, is therefore driven at a different rotational speed depending on a transmission stage selected in the transmission arrangement 30. The towing vehicle 10 may have one or more ground engagement means in the form of wheels 28 which engage with an underlying surface to transmit drive forces and/or by way of which the towing vehicle 10 is supported on the underlying surface. The towing vehicle 10 may moreover have a chassis, it being possible for the chassis in particular to be borne by the wheels suspended on the front and the rear vehicle axle 14, 26.

In addition, a device 50 according to the disclosure with a control unit 52 (e.g., a controller including a processor and memory) for carrying out the method according to the disclosure is also contained in the towing vehicle 10.

Figure 2:
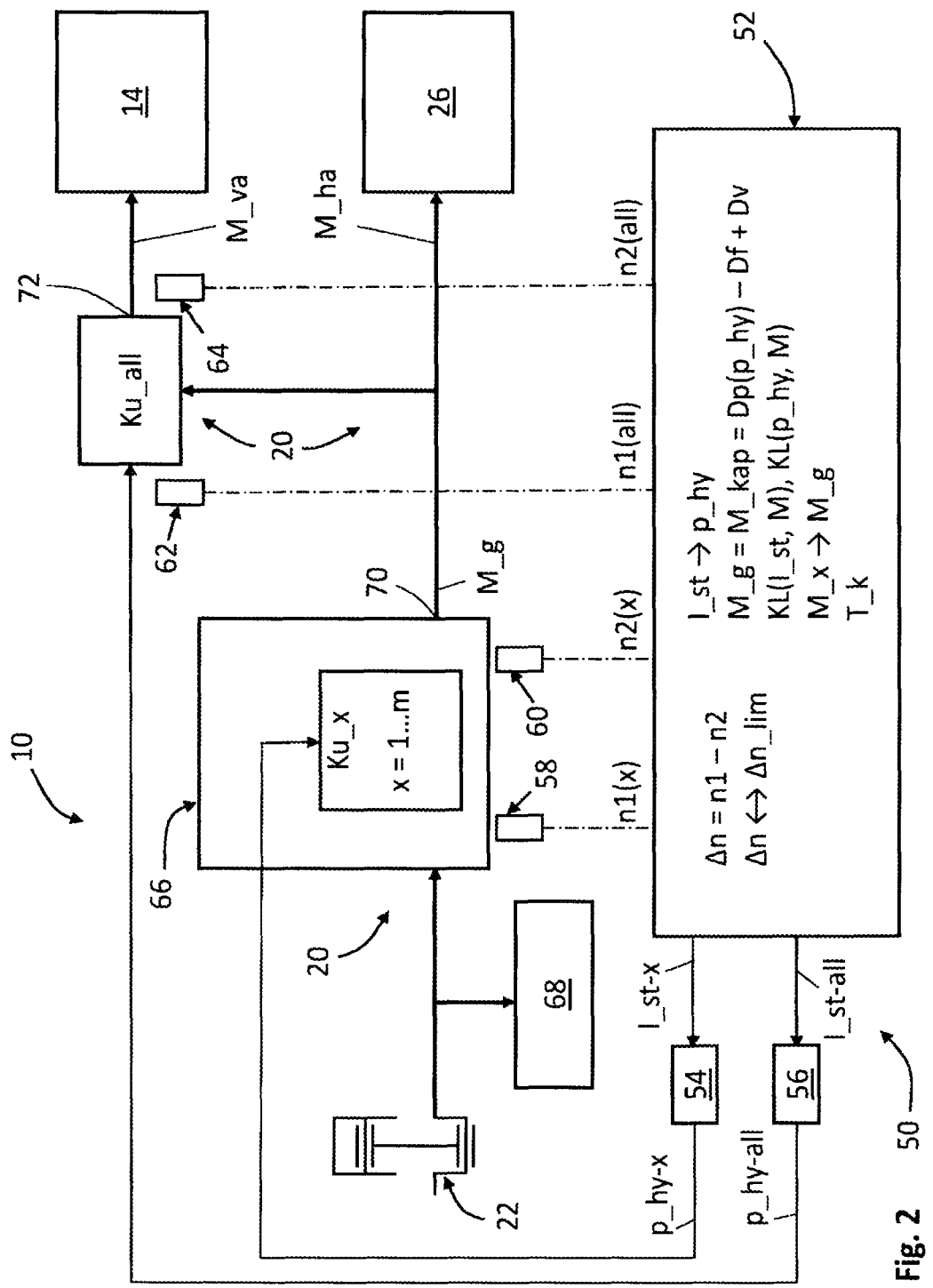
FIG. 2 shows a schematic illustration in the manner of a block diagram of individual components of the agricultural towing vehicle and of a first exemplary embodiment of the device according to the disclosure for carrying out the method according to the disclosure.

FIG. 2 shows a schematic illustration in the manner of a block diagram of an exemplary embodiment of the device 50 and individual component parts of the towing vehicle 10.

As already mentioned, the device 50 comprises the control unit 52. The device also comprises two valves 54, 56 which may be designed in particular as electromechanical actuators and/or hydraulic valves and are representative of another required number of electromechanical actuators and/or hydraulic valves and are actuated by the control unit 52. Furthermore, a plurality of rotational speed sensors 58, 60, 62, 64 are part of the device 50.

The valves 54, 56 can be designed in particular as proportional valves. The valves 54, 56 are each actuated by an electrical control current I_st of the control unit 52, i.e. by the control current I_st-x for the valve 54 and by the control current I_st-all for the valve 56.

The valve 54 can be used to control an electromechanically or hydraulically operated clutch Ku_x within a vehicle transmission 66, which is part of the transmission arrangement 30, between a closed state and an open state. In this case, x is a natural number from 1 to m. A drive-side rotational speed n1(x) and an output-side rotational speed n2(x) are captured at the respective clutch Ku_x. For this purpose, the device 50 comprises one or more first drive-side rotational speed sensor(s) 58 and one or more second output-side rotational speed sensor(s) 60. In other words, the first rotational speed sensor 58 is arranged in particular on the drive side of the clutch Ku_x and the second rotational speed sensor 60 is arranged in particular on the output side of the clutch Ku_x.

An all-wheel clutch Ku_all can be controlled between a closed state and an open state by means of the valve 56. The all-wheel clutch Ku_all enables all-wheel drive if required by also additionally driving the front vehicle axle 14 in addition to the rear vehicle axle 26. An MFWD (Mechanical Front Wheel Drive) system is for example used in this case. Drive-side rotational speeds n1(all) and output-side rotational speeds n2(all) at the all-wheel clutch Ku_all are basically captured in the same way as explained with regard to the clutch Ku_x. The device 50 therefore has, with respect to the all-wheel clutch Ku_all, a further pair of rotational speed sensors, namely a first, drive-side rotational speed sensor 62 and a second, output-side rotational speed sensor 64. In other words, the first rotational speed sensor 62 is arranged in particular on the drive side of the all-wheel clutch Ku_all and the second rotational speed sensor 64 is arranged in particular on the drive side of the all-wheel clutch Ku_all.

The driving power of the drive motor 22 is required for the drive train 22 and for other power consumers 68 (e.g. fan, water pump, battery, air conditioning compressor, vehicle hydraulics) of the towing vehicle 10 and/or an attachment. The torque output from the drive motor 22 is distributed accordingly, with the result that a torque M_g is available at a transmission output 70 of the vehicle transmission 66. This torque M_g can be determined using the control unit 52. A torque M_va can also be determined at a clutch output 72 of the all-wheel clutch Ku_all. Torques acting at other positions of the drive train 20 can also be determined by means of the control unit 52.

To determine the torque M_g, a suitable clutch Ku_x is selected and controlled by the assigned valve—in this case the valve 54. The control current I_st-x is changed in such a way that the clutch Ku_x is controlled in the direction of the open state. During clutch control, a rotational speed difference Δn between the rotational speeds n1(x), n2(x) captured on the drive and output sides of the clutch Ku_x is determined. This rotational speed difference Δn is compared with a predetermined difference limit value Δn_lim. The difference limit value Δn_lim is predetermined in such a way that it corresponds approximately to a "starting slip" state at the clutch Ku_x. Therefore, the capture of the value of a physical variable that causes the clutch control is relevant at least at the time at which the rotational speed difference Δn reaches or exceeds the difference limit value Δn_lim. The captured value of this physical variable can then be linked to provided characteristic data (e.g. characteristic curve, formula) which represent a relationship between the physical variable that causes the clutch control and a torque capacity M_kap of the clutch Ku_x or the torque M_g equated therewith.

The above-mentioned physical variable is for example the control current I_st. Starting from a value of the control current I_st, the torque M_g is for example determined by first determining the value of a corresponding output pressure p_hy-x via a known valve characteristic curve. This pressure value can then be inserted into a formula for the torque capacity M_kap=Dp(p_hy)−Df+Dv, the components Df and dv of which are known in a manner specific to the clutch and the component dp of which depends on the output pressure p_hy of a clutch. Thus, the torque M_g sought can be easily determined technically and mathematically using the previous considerations.

Another suitable characteristic curve KL(I_st, M) can also be provided as characteristic data, which characteristic curve represents a direct relationship between the control current I_st and a torque M or a torque capacity at the clutch Ku_x.

Alternatively, the above-mentioned physical variable is the hydraulic output pressure p_hy, the values of which are captured by means of a pressure sensor and can be evaluated in the control unit 52. The relevant pressure value for determining the torque M_g can then be entered directly into the formula for the torque capacity M_kap or linked to a clutch-specific characteristic curve KL(p_hy, M) which represents a direct relationship between the output pressure p_hy and a torque M or a torque capacity at the clutch Ku_x.

Since a plurality of clutches Ku_x are present in the vehicle transmission 66, more than one clutch Ku_x can be used to respectively determine a torque M_x according to the above explanations. These torques can then be mathematically averaged to represent the torque M_g.

Furthermore, the existing clutches Ku_x can be used to repeatedly determine the torque M_g over time in alternation with another clutch Ku_x in order to make it possible to control all clutches Ku_x uniformly over the course of the operating time.

In a similar manner to the determination of the torque M_g, a torque M_va can be determined using the all-wheel clutch Ku_all and the two rotational speed sensors 62, 64. This can be used to determine a torque M_ha (M_ha=M_g−M_va) for the drive of the rear vehicle axle 26.

Furthermore, a traction coefficient T_k of the towing vehicle 10 can be determined in a technically simple manner by means of the determined torques M_va, M_ha and known variables at the towing vehicle 10 and its wheels 28.

The explained determination of the various torques M_g, M_va, M_ha and traction coefficients T_k is therefore used to provide technical simple and efficient drive management (e.g. traction aid) for the towing vehicle 10.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the drawings, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A method for determining a torque acting at a position of a drive train of an agricultural towing vehicle, comprising:
   controlling a clutch of the drive train between a closed state and an open state;
   capturing a drive-side rotational speed at the clutch via a first rotational speed sensor;
   capturing an output-side rotational speed at the clutch via a second rotational speed sensor;
   controlling the clutch in the direction of the open state;
   determining, during controlling the clutch in the direction of the open state, a difference between the rotational speeds on the drive and output sides;
   comparing the difference with a predetermined difference limit value;
   capturing the value of a physical variable that causes the clutch control on the basis of the comparison result; and
   determining the torque on the basis of the captured value of the physical variable.

2. The method of claim 1, wherein the value of the physical variable is captured if the difference reaches or exceeds the difference limit value.

3. The method of claim 1, wherein the clutch is controlled by a hydraulic valve.

4. The method of claim 3, wherein the value of an output pressure of the hydraulic valve is captured and forms the physical variable that causes the clutch control.

5. The method of claim 3, wherein the value of an electrical control current of the hydraulic valve is captured and forms the physical variable that causes the clutch control.

6. The method of claim 1, wherein the torque is determined on the basis of provided characteristic data which represent a relationship between the physical variable that causes the clutch control and the torque.

7. The method of claim 1, wherein a torque is respectively determined with a plurality of clutches on the basis of the value of the physical variable that causes the clutch control, which torques are mathematically averaged for the purpose of determining the torque acting at a position of the drive train.

8. The method of claim 1, wherein the determination of the torque acting at a position of the drive train is repeated over time and a different clutch within the drive train is controlled for the repetition.

9. The method of claim 1, wherein the clutch is an all-wheel clutch for activating and deactivating a front-axle drive of an agricultural towing vehicle is controlled.

10. The method of claim 1, wherein a traction coefficient of an agricultural towing vehicle is determined on the basis of the determined torque.

11. A device for determining a torque acting at a position of a drive train of an agricultural towing vehicle, comprising:
    a hydraulic valve for controlling a clutch of the drive train between a closed state and an open state;
    a first rotational speed sensor for capturing a drive-side rotational speed at the clutch;
    a second rotational speed sensor for capturing an output-side rotational speed) at the clutch; and
    a control unit configured to:
      control the clutch in the direction of the open state;
      determine, during controlling the clutch in the direction of the open state, a difference between the rotational speeds on the drive and output sides;

compare the difference with a predetermined difference limit value;

capture the value of a physical variable that causes the clutch control on the basis of the comparison result; and determine the torque on the basis of the captured value of the physical variable.

12. The device of claim 11, wherein the value of the physical variable is captured if the difference reaches or exceeds the difference limit value.

13. The device of claim 11, wherein the clutch is controlled by a hydraulic valve.

14. The device of claim 13, wherein the value of an output pressure of the hydraulic valve is captured and forms the physical variable that causes the clutch control.

15. The device of claim 13, wherein the value of an electrical control current of the hydraulic valve is captured and forms the physical variable that causes the clutch control.

16. The device of claim 11, wherein the torque is determined on the basis of provided characteristic data which represent a relationship between the physical variable that causes the clutch control and the torque.

17. The device of claim 11, wherein a torque is respectively determined with a plurality of clutches on the basis of the value of the physical variable that causes the clutch control, which torques are mathematically averaged for the purpose of determining the torque acting at a position of the drive train.

18. The device of claim 11, wherein the determination of the torque acting at a position of the drive train is repeated over time and a different clutch within the drive train is controlled for the repetition.

19. The device of claim 11, wherein the clutch is an all-wheel clutch for activating and deactivating a front-axle drive of an agricultural towing vehicle is controlled.

20. The device of claim 11, wherein a traction coefficient of an agricultural towing vehicle is determined on the basis of the determined torque.

* * * * *